(12) United States Patent
Fukumoto et al.

(10) Patent No.: US 6,231,112 B1
(45) Date of Patent: May 15, 2001

(54) VEHICLE DOOR ASSEMBLY

(75) Inventors: Ryoichi Fukumoto; Terutsugu Gotanda; Masaru Hoshina; Motohiro Kokubo; Masayuki Uchitsunemi; Keiichi Fukushima; Hiroshi Takai; Daiichi Shiraishi, all of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/386,516

(22) Filed: Aug. 31, 1999

(30) Foreign Application Priority Data

Aug. 31, 1998 (JP) .................................. 10-244975
Aug. 31, 1998 (JP) .................................. 10-244976

(51) Int. Cl.⁷ .................................. B60J 5/04; B60J 1/08
(52) U.S. Cl. .................................................. 296/146.5
(58) Field of Search ..................... 296/146.5, 146.6, 296/146.2, 146.11, 146.9; 49/502; 74/89.18, 89.19; 292/DIG. 23

(56) References Cited

U.S. PATENT DOCUMENTS

| | | | |
|---|---|---|---|
| 4,174,865 | * 11/1979 | Doveinis | 296/146.2 |
| 4,295,298 | * 10/1981 | Pundt | 296/146.2 |
| 4,743,062 | * 5/1988 | McLaren et al. | 296/146 |
| 4,924,630 | * 5/1990 | Lomasney et al. | 49/502 |
| 5,040,334 | * 8/1991 | Dossin et al. | 296/146.5 |
| 5,306,067 | * 4/1994 | Hull et al. | 296/146.9 |
| 5,429,410 | * 7/1995 | Fleischer | 296/146.6 |
| 5,570,922 | * 11/1996 | DeRees et al. | 296/146.6 |
| 5,573,297 | * 11/1996 | DeRees et al. | 296/146.6 |
| 5,584,144 | * 12/1996 | Hisano | 296/146.5 |
| 5,857,732 | * 1/1999 | Ritchie | 296/146.5 |
| 5,902,004 | * 5/1999 | Waltz et al. | 296/146.9 |
| 5,907,897 | * 6/1999 | Hisano | 296/146.2 |
| 5,908,216 | * 6/1999 | Townsend | 296/146.6 |
| 6,036,255 | * 3/2000 | Lester et al. | 296/146.2 |
| 6,134,840 | * 10/2000 | Pleiss | 49/502 |
| 6,135,537 | * 10/2000 | Giddons | 296/146.6 |
| 6,148,564 | * 11/2000 | Dancasius | 49/502 |

FOREIGN PATENT DOCUMENTS

| | | | |
|---|---|---|---|
| 004212261 A1 | * 10/1993 | (DE) | 296/146.2 |
| 004343254 A1 | * 6/1994 | (DE) | 296/146.2 |
| 0752336 A1 | * 1/1997 | (EP) . | |
| 002698047 A1 | * 5/1994 | (FR) | 296/146.2 |
| 62-189921 | 12/1987 | (JP) . | |
| 404191123 | * 7/1992 | (JP) | 296/146.2 |
| 404257728 | * 9/1992 | (JP) | 296/146.2 |
| 405058158 | * 3/1993 | (JP) | 296/146.5 |
| 405178092 | * 7/1993 | (JP) | 296/146.5 |
| 406080022 | * 3/1994 | (JP) | 296/146.5 |

* cited by examiner

Primary Examiner—D. Glenn Dayoan
Assistant Examiner—Hilary Gutman
(74) Attorney, Agent, or Firm—Burns, Doane, Swecker & Mathis, LLP

(57) ABSTRACT

A vehicle door assembly includes a door inner panel having a hinge attachment portion on which is to be mounted a pair of door hinge devices and a lock attachment portion on which is to be mounted a door lock device. A base panel has four arm portions that connect the base panel to the door inner panel. The four arm portions include first and a second arm portions fixed to the hinge attachment portion of the door inner panel, and a third arm portion attached to the lock attachment portion of the door inner panel.

19 Claims, 12 Drawing Sheets

VEHICLE DOOR ASSEMBLY

This application is based on and claims priority under 35 U.S.C. § 119 with respect to Japanese Application No. 10(1998)-244975 filed on Aug. 31, 1998 and Japanese Application No. 10(1998)-244976 filed on Aug. 31, 1998, the entire content of both of which is incorporated herein by reference.

FIELD OF THE INVENTION

The present invention generally relates to a vehicle door. More particularly, the present invention pertains to a vehicle door assembly that includes a door inner panel attached to a pair of door hinge devices, a door lock device and a base panel.

BACKGROUND OF THE INVENTION

A known type of vehicle door assembly is disclosed in Japanese Utility Model Laid-Open Publication No. 62(1987)-189921. This vehicle door assembly includes a door inner panel and a base panel. The door inner panel possesses a frame shape and the base panel possesses an X-shape having four arm portions. The four arms of the base panel are fixed by welding to the four corner portions of the door inner panel so that the base panel is united to the door inner panel by the four arms. Therefore, the strength of the vehicle door assembly is secured by the door inner panel and the base panel.

In the above-described vehicle door assembly, a pair of door hinge devices, a door lock device and the door outer panel are adapted to be mounted on the door inner panel. By virtue of this construction, the attachment strength of the door hinge devices and the lock device is secured by only the door inner panel. Because the four arms of the base panel are fixed to the four corner portions of the door inner panel, the thickness of the inner panel must be increased to provide sufficient strength. Therefore, the thickness of the door inner panel is increased. As a result, the weight of the vehicle door assembly is increased.

In light of the foregoing, a need exists for a vehicle door assembly having sufficient strength, but without a significant increase in weight.

SUMMARY OF THE INVENTION

According to one aspect of the present invention, the vehicle door assembly includes a door inner panel and a base panel. The door inner panel possesses a hinge attachment portion on which is to be mounted a pair of door hinge devices and a lock attachment portion on which is to be mounted a door lock device. The base panel has four arm portions that connect the base panel to the door inner panel. The four arm portions include first and a second arm portions fixed to the hinge attachment portion of the door inner panel, and a third arm portion attached to the lock attachment portion of the door inner panel.

According to another aspect of the invention, a vehicle door assembly includes a door inner panel having a hinge attachment portion and a lock attachment portion, a pair of door hinge devices mounted on the hinge attachment portion of the door inner panel by respective first securing devices, a door lock device mounted on the lock attachment portion by a second securing device, and a base panel having at least three arm portions connecting the base panel to the door inner panel. The three arm portions include a first arm portion connected to the hinge attachment portion of the door inner panel by one of the first securing devices, a second arm portion connected to the hinge attachment portion of the door inner panel by one of the first securing devices, and a third arm portion attached to the lock attachment portion of the door inner panel by the second securing device.

In accordance with another aspect of the invention, a vehicle door assembly includes a door inner panel having a hinge attachment portion and a lock attachment portion, a pair of door hinge devices mounted on the hinge attachment portion of the door inner panel by respective first securing devices, a door lock device mounted on the lock attachment portion by a second securing device, and a base panel having a plurality of arm portions connecting the base panel to the door inner panel. In addition, a door frame forming a window opening has one end connected to the hinge attachment portion of the door inner panel by one of the first securing devices and has another end connected to the lock attachment portion the door inner panel.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
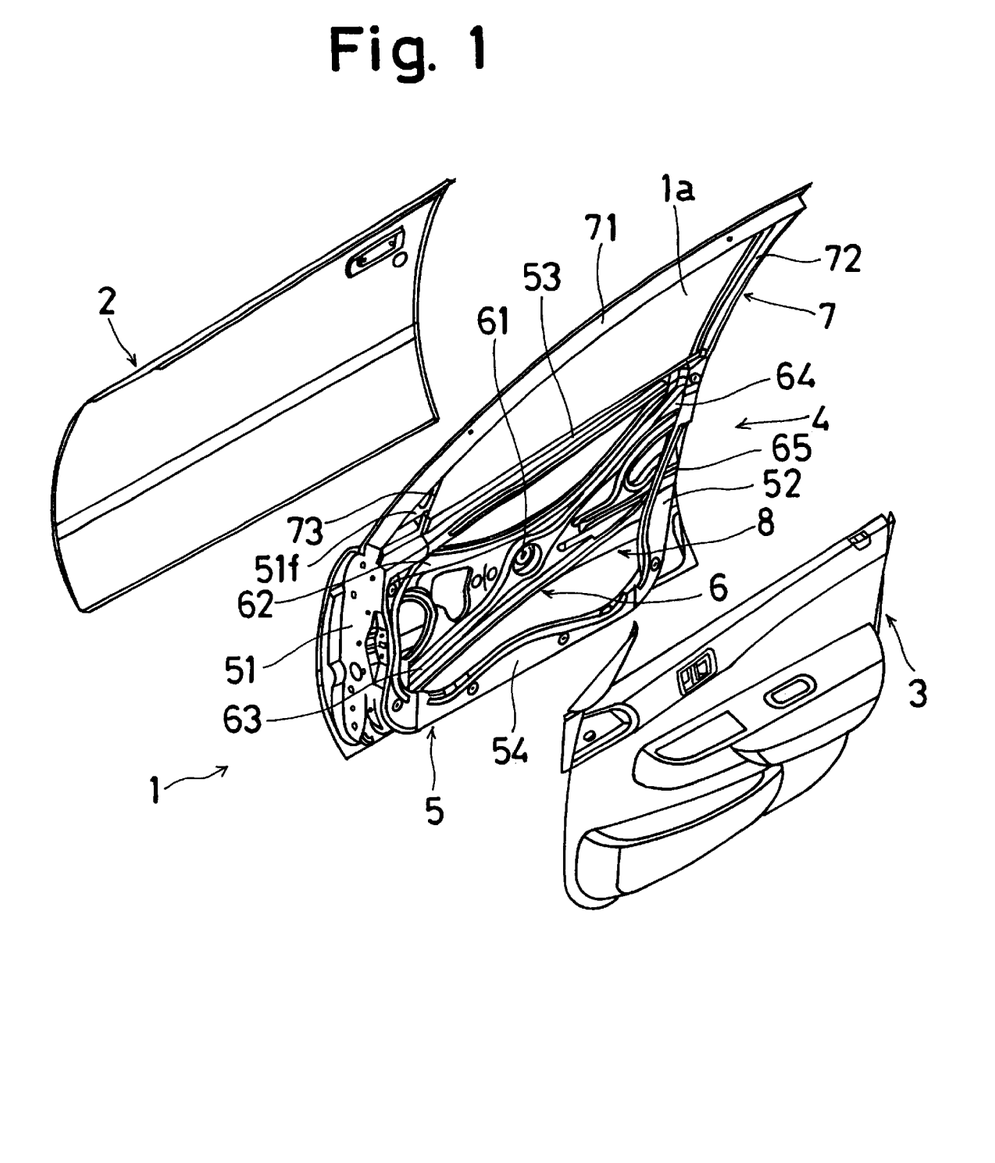
FIG. 1 is an exploded perspective view of a vehicle door assembly according to the present invention.
Figure 2:
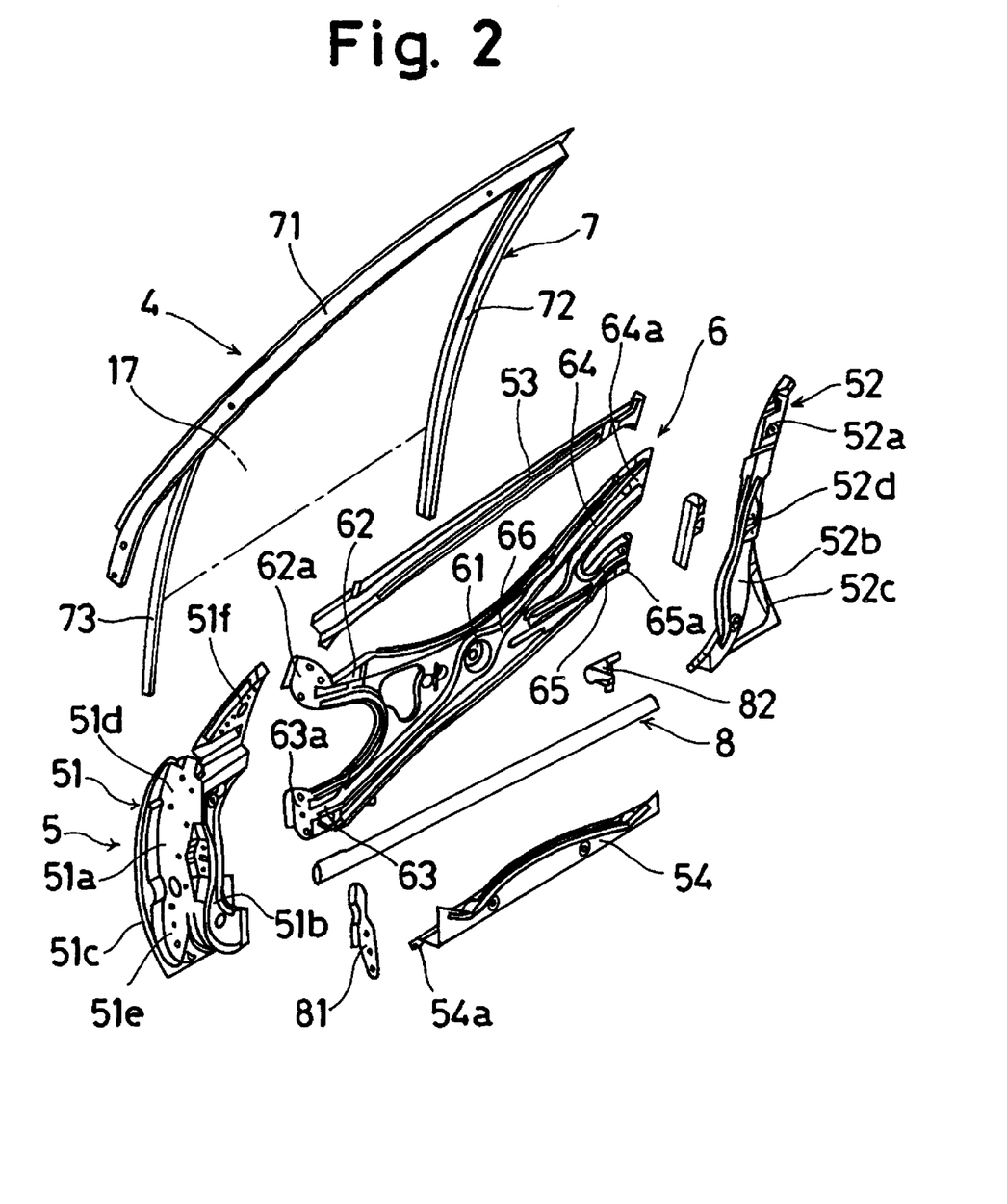
FIG. 2 is an exploded perspective view of the inner module of the vehicle door assembly illustrated in FIG. 1.

Referring initially to FIGS. 1 and 2, the vehicle door 1 includes a door outer panel 2, a door trim 3 and an inner module 4. The door outer panel 2 provides the external appearance of the vehicle door 1 while the door trim 3 provides the internal appearance of the vehicle door 1. The inner module 4 defines the skeleton of the vehicle door 1.

The inner module 4 is arranged between the door outer panel 2 and the door trim 3. The inner module 4 supports the door outer panel 2 at the side of the inner module 4 facing outwardly of the vehicle compartment and also supports the door trim 3 at the side of the inner module 4 facing inwardly of the vehicle compartment.

As shown in FIGS. 3–10, the inner module 4 includes a door inner panel 5, a base panel 6, a door frame 7, and a door impact beam 8. The door inner panel 5 is defined by a hinge side panel 51, a lock side panel 52, an upper reinforcement 53, and a lower panel 54. The hinge side panel 51 is arranged along a front edge of the door outer panel 2 (i.e., is located on the left-hand side with reference to the illustration in FIG. 4). The hinge side panel 51 is configured to possess a substantially L-shaped cross-section, including a vertical wall 51a and a lateral wall 51 lb. The vertical wall 51a of the hinge side panel 51 forms a front end wall of the vehicle door 1, and the lateral wall 51b of the hinge side panel 51 extends to the inner edge of the vertical wall 51a and is parallel to the door outer panel 2. A flange wall 51c is formed at the outer edge of the vertical wall 51a and extends in a direction opposite the lateral wall 51b.

Figure 4:
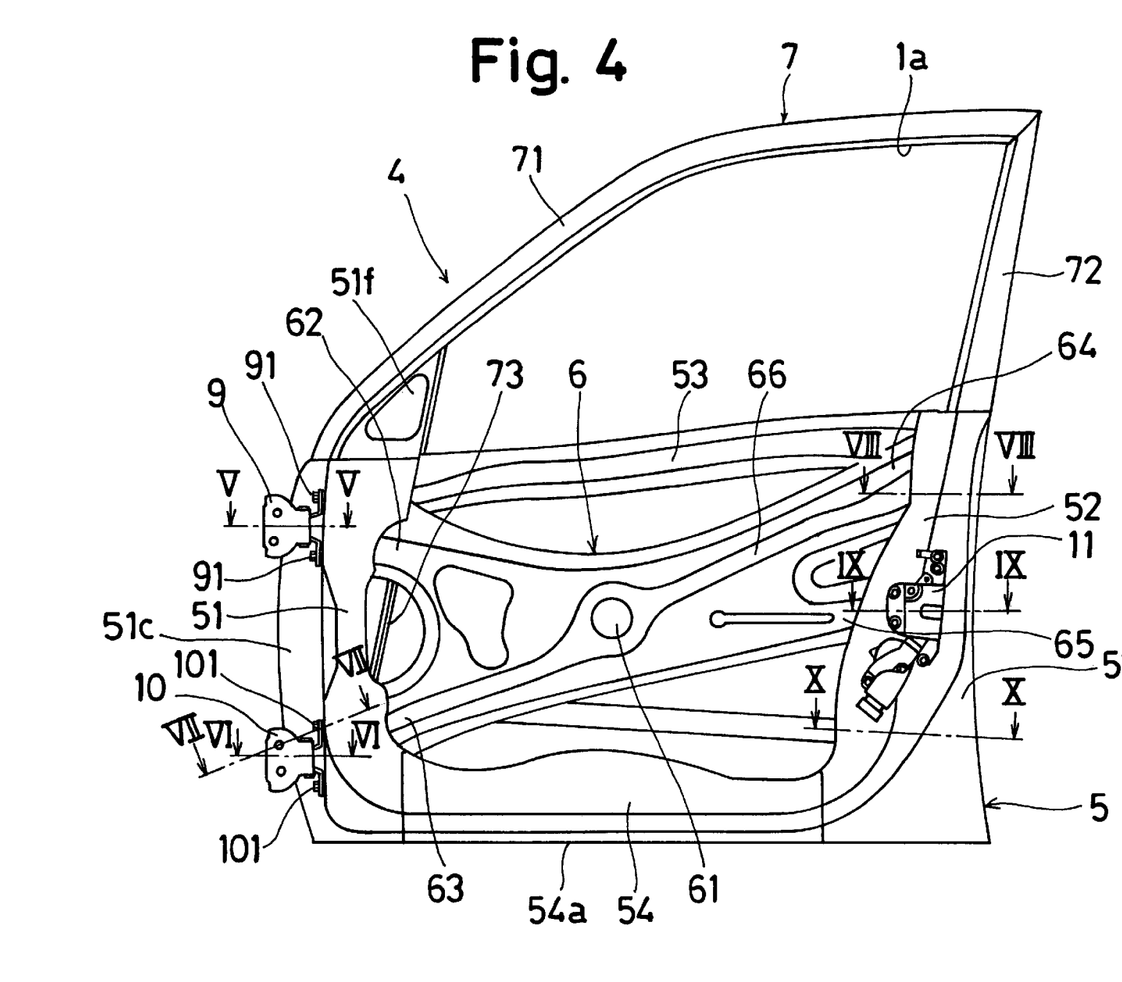
FIG. 4 is a front view of the inner module of the vehicle door assembly illustrated in FIG. 1.

The lock side panel 52 is arranged along the rear edge of the door outer panel 2 (i.e., is located on the right-hand side with reference to the illustration in FIG. 4). The lock side panel 52 is configured to possess a substantially reverse L-shape cross-section, including a vertical wall 52a and a lateral wall 52b. The vertical wall 52a of the lock side panel 52 forms the rear end wall of the vehicle door 1. The lateral wall 52b of the lock side panel 52 extends to the inner edge of the vertical wall 52a and is parallel to the door outer panel 2. A flange wall 52c is formed at the outer edge of the vertical wall 52a and extends in a direction opposite the lateral wall 51b.

The upper reinforcement 53 is arranged along the upper edge of the door outer panel 2. The front end of the upper reinforcement 53 is welded to the hinge side panel 51 while the rear end of the upper reinforcement 53 is welded to the lock side panel 52.

Figure 5:
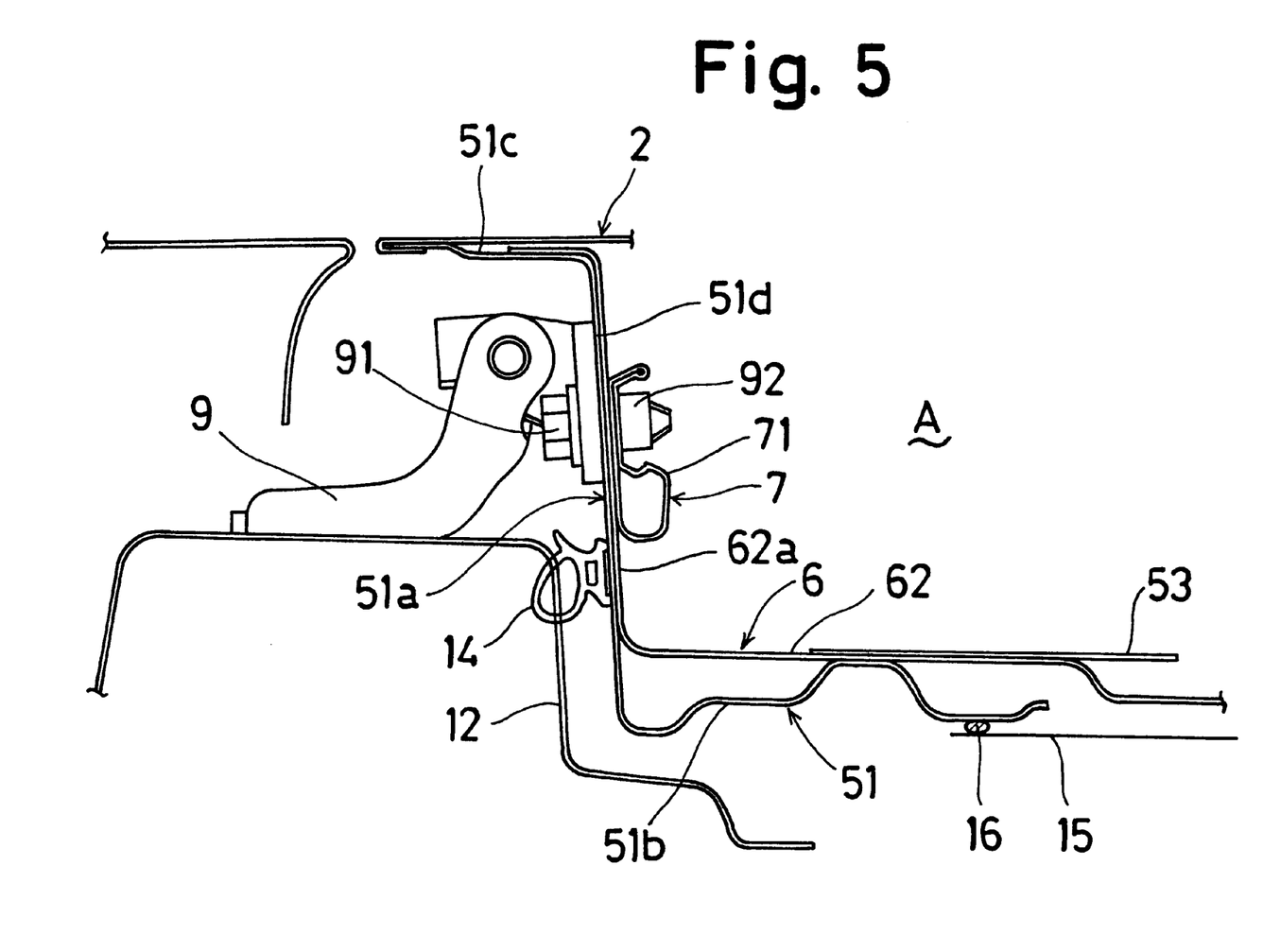
FIG. 5 is a cross-sectional view taken along the section line V—V in FIG. 4.

The lower panel 54 is arranged along the lower edge of the door outer panel 2. The front end of the lower panel 54 is welded to the hinge side panel 51 and the rear end of the lower panel 54 is welded to the lock side panel 52. The lower panel 54 is configured to possess an L-shape cross-section that is generally the same as the hinge and lock side panels 51, 52. A flange wall 54a that is generally the same as the flange walls 51c, 52c is formed at the outer edge of the lower panel 54. The lower panel 54 forms the lower end wall of the vehicle door The hinge side panel 51, the lock side panel 52, the upper reinforcement 53 and the lower panel 54 define the door inner panel 5 configured to possess a frame shape. The flange walls 51c, 52c, 54a are fixed to the front, rear and lower edges of the door outer panel 2 respectively by a hemming roll process in which edges of the outer panel 2 are bent back on themselves to receive a portion of the flange walls 51c, 52c, 54a as shown in FIGS. 4 and 5. Therefore, the door outer panel 2 is united to the door inner panel 5. An internal space A is formed between the door outer panel 2 and the door inner panel 5. As described below in more detail, this internal space A is adapted to accommodate a window glass which moves up and down through an opening provided between the upper reinforcement and the door outer panel.

A pair of door hinge devices 9, 10 is attached to the hinge side panel 51 of the door inner panel 5. A hinge attachment portion 51d to which is attached the door hinge device 9 is formed at the upper side portion of the vertical wall 51a of the hinge side panel 51 as seen in FIGS. 2 and 5. A hinge attachment portion 51e to which is attached the other door hinge device 10 is formed at the lower side portion of the vertical wall 51a of the hinge side panel 51. The hinge devices 9, 10 rotatably support the vehicle door 1 on the vehicle body 12 (shown in FIG. 5) at the front end wall of the vehicle door 1.

As shown in FIGS. 4 and 5, the door hinge device 9 is arranged relative to the vertical wall 51a of the hinge side panel 51 so that the hinge device 9 is located exteriorly of or outside the internal space A of the vehicle door 1. The door hinge device 9 is secured to the hinge attachment portion 51d of the vertical wall 51a by a securing device which in the illustrated embodiment is in the form of a bolt 91 and a nut 92. The other door hinge device 10 is arranged relative to the vertical wall 51a of the hinge side panel 51 so that the hinge device 10 is located exteriorly of or outside the internal space A of the vehicle door 1. The door hinge device 10 is secured to the hinge attachment portion 51e of the vertical wall 51a by a securing device which in the illustrated embodiment is in the form of a bolt 101 and a nut 102.

Figure 6:
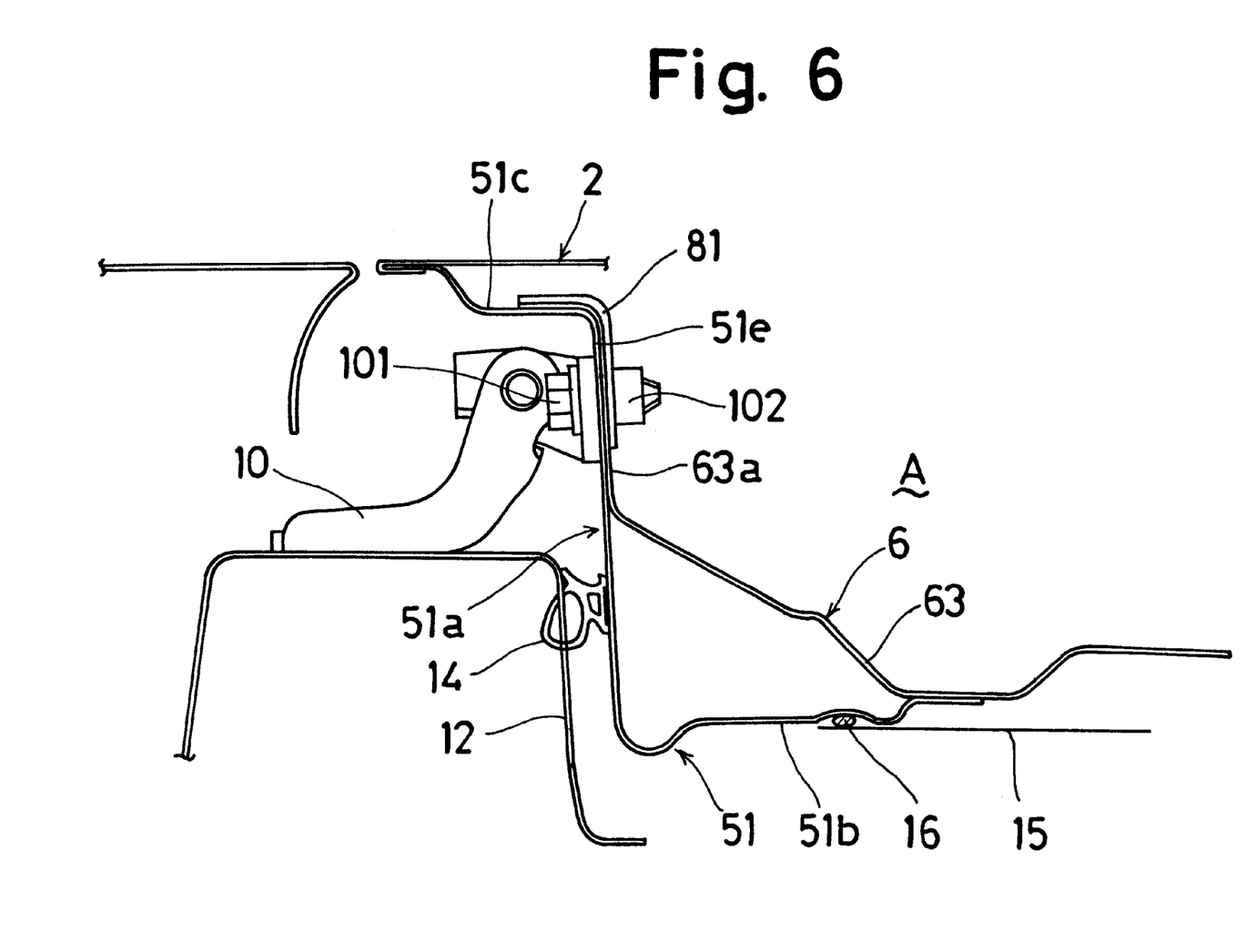
FIG. 6 is a cross-sectional view taken along the section line VI—VI in FIG. 4.
Figure 7:
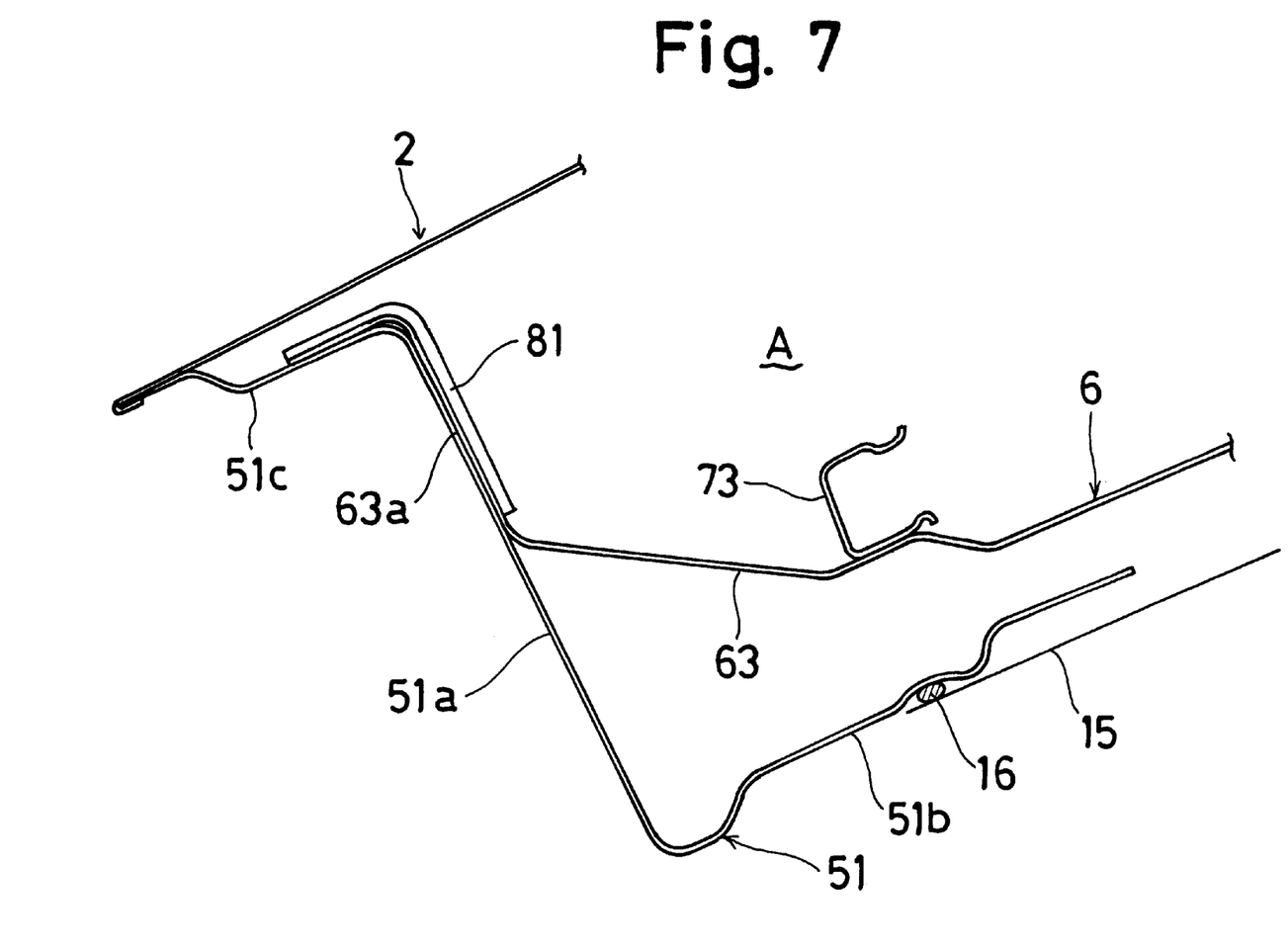
FIG. 7 is a cross-sectional view taken along the section line VII—VII in FIG. 4.
Figure 8:
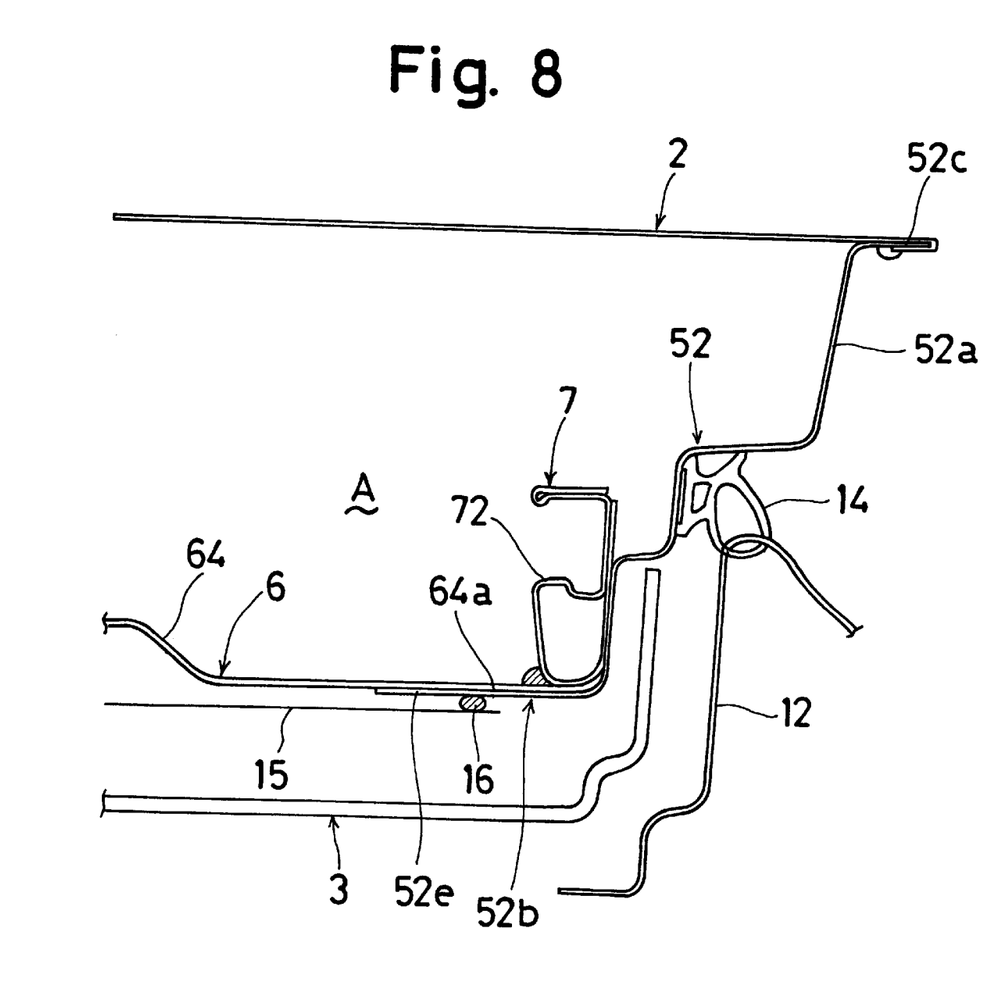
FIG. 8 is a cross-sectional view taken along the section line VIII—VIII in FIG. 4.
Figure 9:
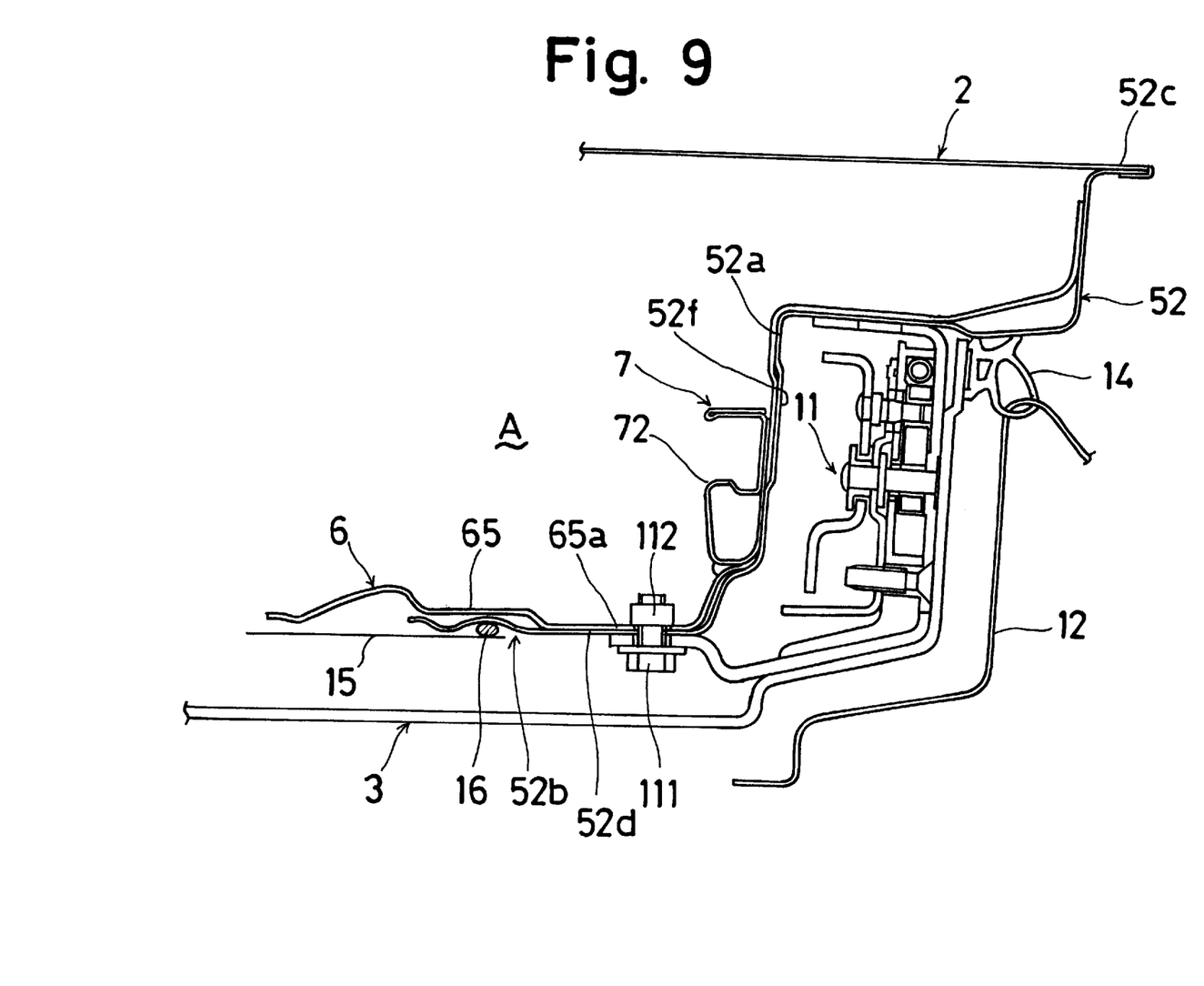
FIG. 9 is a cross-sectional view taken along the section line IX—IX in FIG. 4.

As shown in FIGS. 4–9, a door lock device 11 is attached to the lock side panel 52 of the door inner panel 5. A lock attachment portion 52d to which is attached to the door lock device 11 is formed in a center portion of the lateral wall 52b of the lock side panel 52 as shown in FIG. 9. A recessed portion 52f is formed in the vertical wall 52a of the lock side panel 52. Also, a connecting portion 52e is formed in the upper side portion of the lateral wall 52b as depicted in FIG. 8.

The door lock device 11 is adapted to engage and disengage the vehicle door 1 to the vehicle body 12 (as shown in FIG. 9) at the rear end wall of the vehicle door 1. As shown in FIGS. 4 and 9, the door lock device 11 is arranged in the recessed portion 52f of the vertical wall 52a of the lock side panel 52 from outside the internal space A of the vehicle door 1. The door lock device 11 is screwed to the lock attached portion 52d of the lateral wall 52b of the lock side panel 52 by a bolt 111 and a nut 112. Therefore, the vehicle door 1 is supported with respect to the vehicle body 12 for opening and closing movement by the door hinge devices 9, 10 and the door lock device 11.

As shown in FIGS. 5, 6, 8, 9 and 10, a weather strip 14 which is sealed between the vehicle door 1 and the vehicle body 12 is fixed to the vertical walls of the hinge and lock side panel 51, 52 and the lower panel 54 of the door inner panel 5, and the door frame 7.

As shown in FIGS. 3–10, the base panel 6 is X-shaped, having four arm portions 62, 63, 64, 65 which extend from a center portion 61 of the base panel 6. The base panel 6 is arranged in parallel to the door outer panel 2. The arm portion 62 extends toward the front upper corner of the door outer panel 2. As shown in FIG. 5, a fixing portion 62a is formed at the end of the arm portion 62. This fixing portion 62a of the arm portion 62 is arranged in parallel to the vertical wall 51a of the hinge side panel 51 and is adapted to be opposite the hinge attachment portion 51d of the vertical wall 51a of the hinge side panel 51 of the door inner panel 5. Thus, the fixing portion 62a of the arm portion 62 is located opposite the hinge attachment portion 51d to which is attached the door hinge device 9. The fixing portion 62a is welded to the vertical wall 51a and the lateral wall 51b of the hinge side panel 51 forming the inner space A of the vehicle door 1. The fixing portion 62a is also fixed to the hinge attached portion 51d of the vertical wall 51a by the same bolt 91 and nut 92 which secure the door hinge device 9 to the hinge attachment portion 51d of the vertical wall 51a.

The arm portion 63 extends toward the front lower corner of the door outer panel 2. As shown in FIGS. 6 and 7, a fixing portion 63a is formed at the end of the arm portion 63. The fixing portion 63a of the arm portion 63 is arranged in parallel to the vertical wall 51a of the hinge side panel 51 and is opposite the hinge attached portion 51e of the vertical wall 51a of the hinge side panel 51 of the door inner panel 5. Thus, the fixing portion 63a of the arm portion 63 is arranged opposite the hinge attached portion 51e of the vertical wall 51a to which is attached the door hinge device 10. The fixing portion 63a is welded to the vertical wall 51a, the lateral wall 51b and the flange wall 51c of the hinge side panel 51 forming the inner space A of the vehicle door 1. The fixing portion 63a is also fixed to the hinge attached portion 51e of the vertical wall 51a by the same bolt 101 and nut 102 which secure the door hinge device 10 to the hinge attachment portion 51e of the vertical wall 51a.

The arm portion 64 extends toward the rear upper corner of the door outer panel 2. As shown in FIG. 8, a fixing portion 64a is formed at the end of the arm portion 64. This fixing portion 64a of the arm portion 64 is located opposite the connecting portion 52e of the lateral wall 52b of the lock side panel 52 of the door inner panel 5. The fixed portion 64a is welded to the lateral wall 52b of the lock side panel 52 forming the inner space A of the vehicle door 1.

The arm portion 65 extends toward the rear lower corner of the door outer panel 2. As shown in FIG. 9, a fixing portion 65a is formed at the end of the arm portion 65. This fixing portion 65a of the arm portion 65 is located opposite the lock attachment portion 52d of the lateral wall 52b of the lock side panel 52 of the door inner panel 5. Thus, the fixing portion 65a of the arm portion 65 is located opposite the point of securement or attachment of the door lock device 11. The fixed portion 65a is welded to the lateral wall 52b of the lock side panel 52 forming the inner space A of the vehicle door 1 and is fixed to the lock attached portion 52d of the lateral wall 52b by the same bolt 111 and nut 112 which secure the door lock device 11.

The base panel 6 is provided with a rib portion 66 extending diagonally along the base panel 6. The rib portion 66 extends between the two arm portions 63, 64 through the center portion 61 of the base panel 6. The rib portion 66 advantageously reinforces the base panel 6 and so the twist strength of the vehicle door 1 is secured by the base panel 6. The center portion 61 of the base panel 6 is also provided with a through hole 61a and a raised annular part of the rib portion 66 is disposed around the through hole 61a to reinforce the through hole 61a.

The door frame 7 forms a window 1a above the door outer panel 2. The door frame 7 includes a front roof pillar member 71 and a center pillar member 72. The front roof pillar member 71 and the center pillar member 72 are welded to each other. As shown in FIG. 5, the end of the front roof pillar member 71 extends into the internal space A of the vehicle door 1 and is located opposite the hinge attachment portion 51d of the hinge side panel 51 of the door inner panel 5 to which is attached to the door hinge device 9. The end of the front roof pillar member 71 is fixed to the hinge attachment portion 51d by the same bolt 91 and nut 92 which secure the door hinge device 9 in place.

As shown in FIGS. 8 and 9, the end of the center pillar member 72 extends into the internal space A of the vehicle door 1 along the vertical wall 52a of the lock side panel 52 of the door inner panel 5. The end of the center pillar member 72 is welded to the two fixing portions 64a, 65a of the two arm portions 64, 65 of the base panel 6.

A lower frame 73 is arranged in parallel to the center pillar member 72. One end of the lower frame 73 is welded to the front roof pillar member 71 and the other end of the lower frame 73 extends into the internal space A of the vehicle door 1 and is welded to the arm portion 63 of the base panel 6. A door window shield glass 17 is slidably supported on the lower frame 73 and the center pillar member 72. As shown in FIG. 4, a bracket portion 51f is integrally formed on the hinge side panel 51. The bracket portion 51f extends between the front roof pillar member 71 and the lower frame 73, and is adapted to support a mirror device (e.g., a side mirror).

Figure 10:
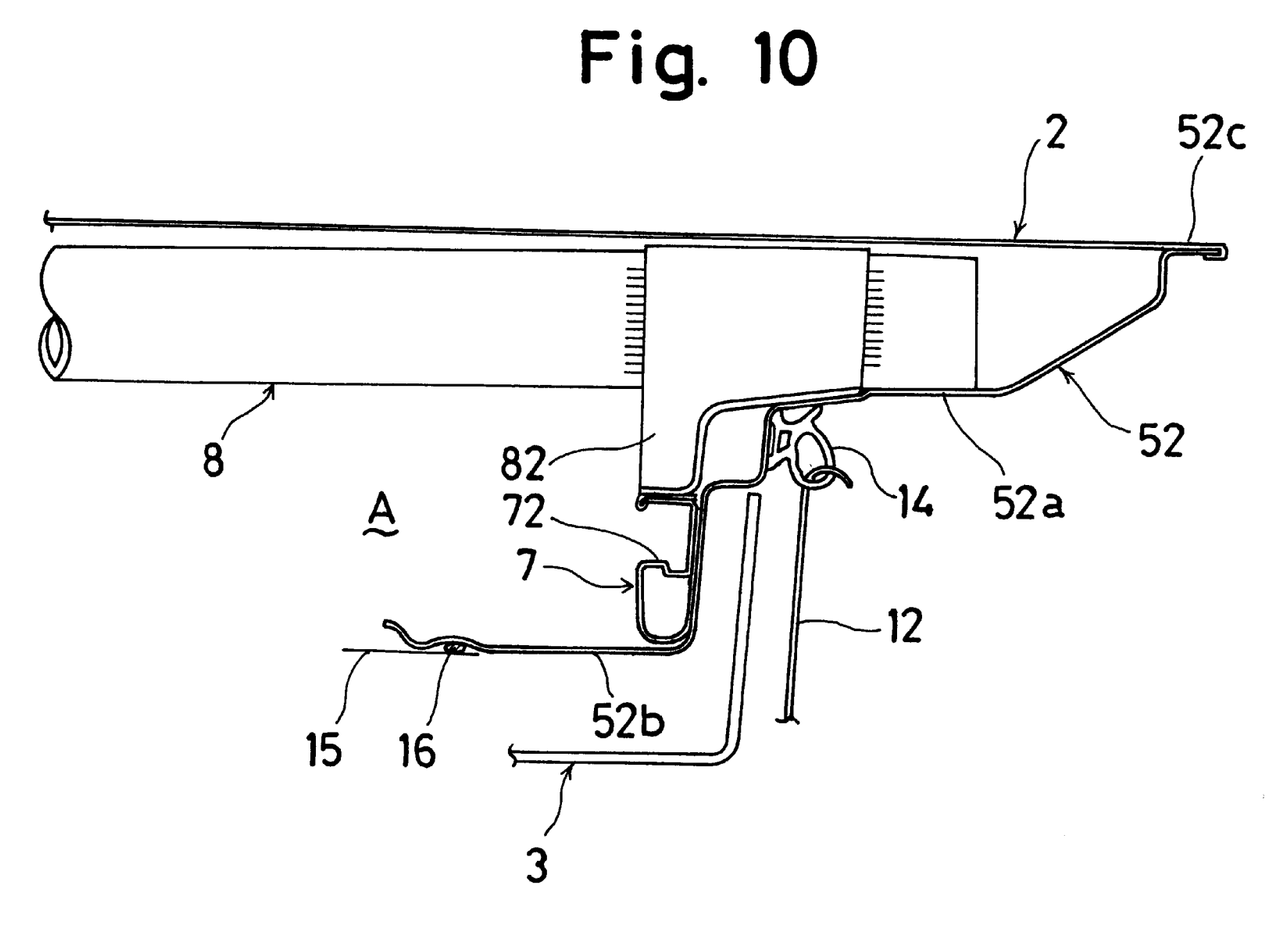
FIG. 10 is a cross-sectional view taken along the section line X—X in FIG. 4
Figure 11:
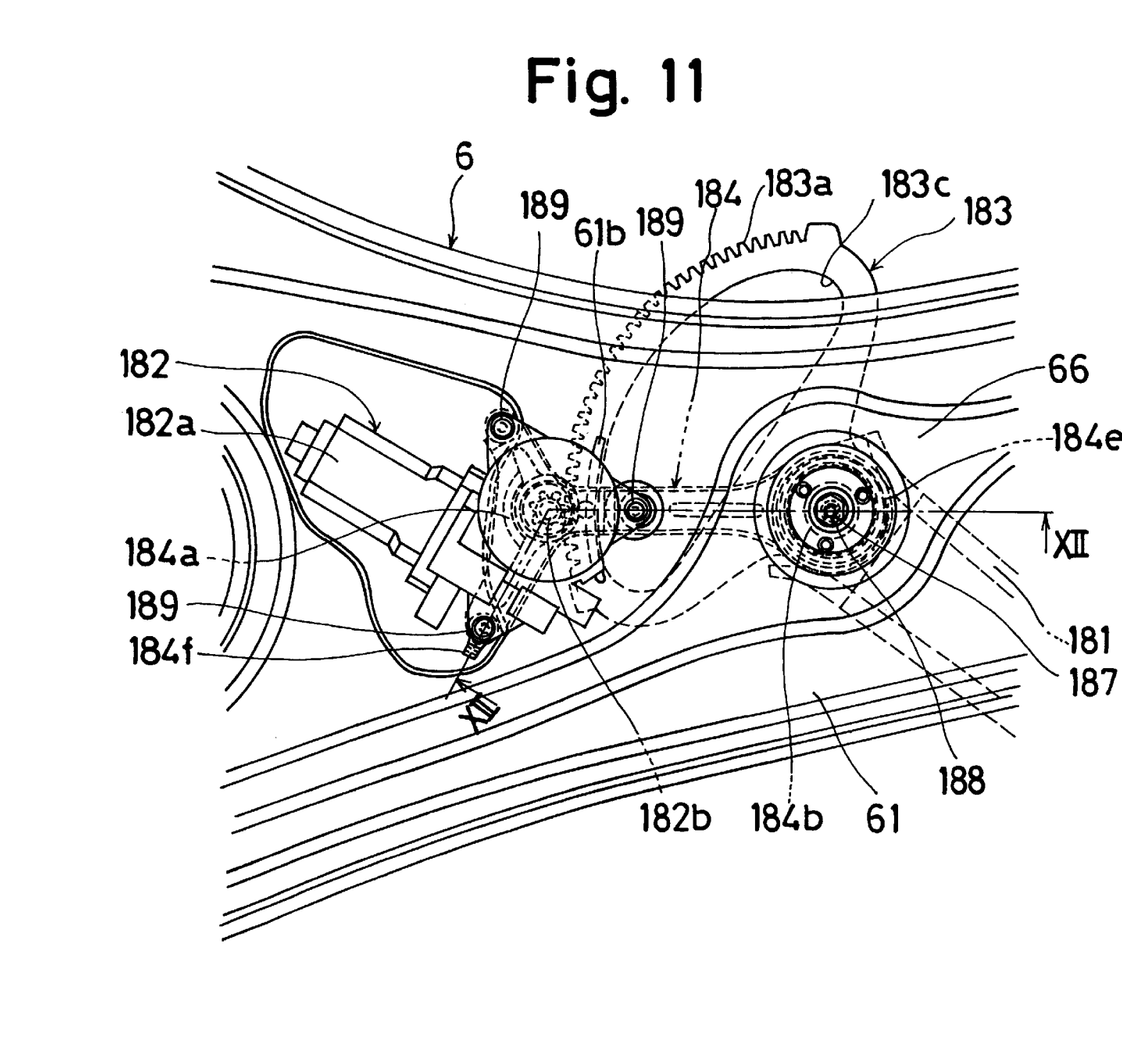
FIG. 11 is a front view of a window regulator device used in the vehicle door assembly according to the present invention.

The door impact beam 8 is positioned within the internal space A of the vehicle door 1 and is arranged substantially parallel to the upper reinforcement 53 and the lower panel 54. One end of the door impact beam 8 is connected to the hinge side panel 51 of the door inner panel 5 by a fixing bracket 81. The other end of the door impact beam 8 is connected to the lock side panel 51 of the door inner panel 5 by a fixing bracket 82. As shown in FIG. 7, the fixing bracket 81 is welded to the fixing portion 63a of the arm portion 63 of the base panel 6 at a position opposite the hinge attachment portion 51e of the hinge side panel 51 of the door inner panel 5 to which is attached the door hinge device 10. The fixing bracket 81 to which is fixed the one end of the door impact beam 8 is fixed to the hinge attachment portion 51e by the same bolt 101 and nut 102 that secure in place the door hinge device 10. As shown in FIG. 10, the fixing bracket 82 to which is fixed the other end of the door impact beam 8 is welded to the vertical wall 52a of the lock side panel 52 of the door inner panel 5 and the end of the center pillar member 72 of the door frame 7.

As shown in FIG. 5–10, a cover 15 is arranged between the door inner panel 5 and the door trim 3 and is bonded with seal material 16 to the door inner panel 5 at the side facing the inner side of the vehicle compartment of the door inner panel 5. The cover 15 thus covers the base panel 6 and the internal space A of the vehicle door 1.

The hinge attachment portions 5d, 51e of the hinge side panel 51 of the door inner panel 5 to which are attached the door hinge devices 9, 10 are reinforced by the fixing portions 62a, 63a of the arm portion 62, 63 of the base panel 6, the end of the front roof pillar member 71 of the door frame 7, and the fixing bracket 81 to which is fixed one end of the door impact beam 8. The lock attachment portion 52d of the lock side panel 52 of the door inner panel 5 to which is attached the door lock device 11 is reinforced by the fixing portion 64a of the arm portion 64 of the base panel 6. Therefore, the load of the door lock device is able to travel to the door hinge devices 9, 10 through the base panel 6, is able to travel to the door hinge devices 9, 10 through the door frame 7, and is able to travel to the door hinge devices 9, 10 through the door impact beam 8.

Figure 3:
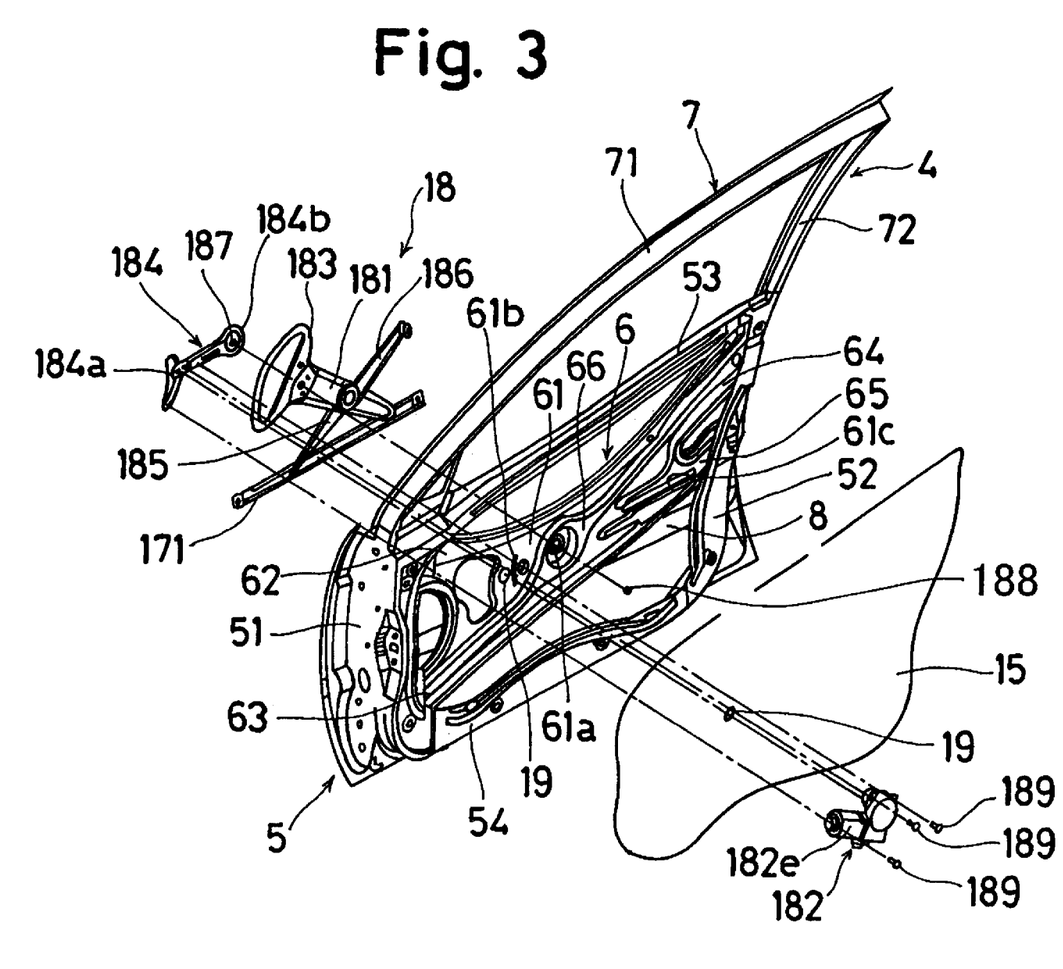
FIG. 3 is an exploded perspective view of the inner module of the vehicle door assembly illustrated in FIG. 1.
Figure 12:
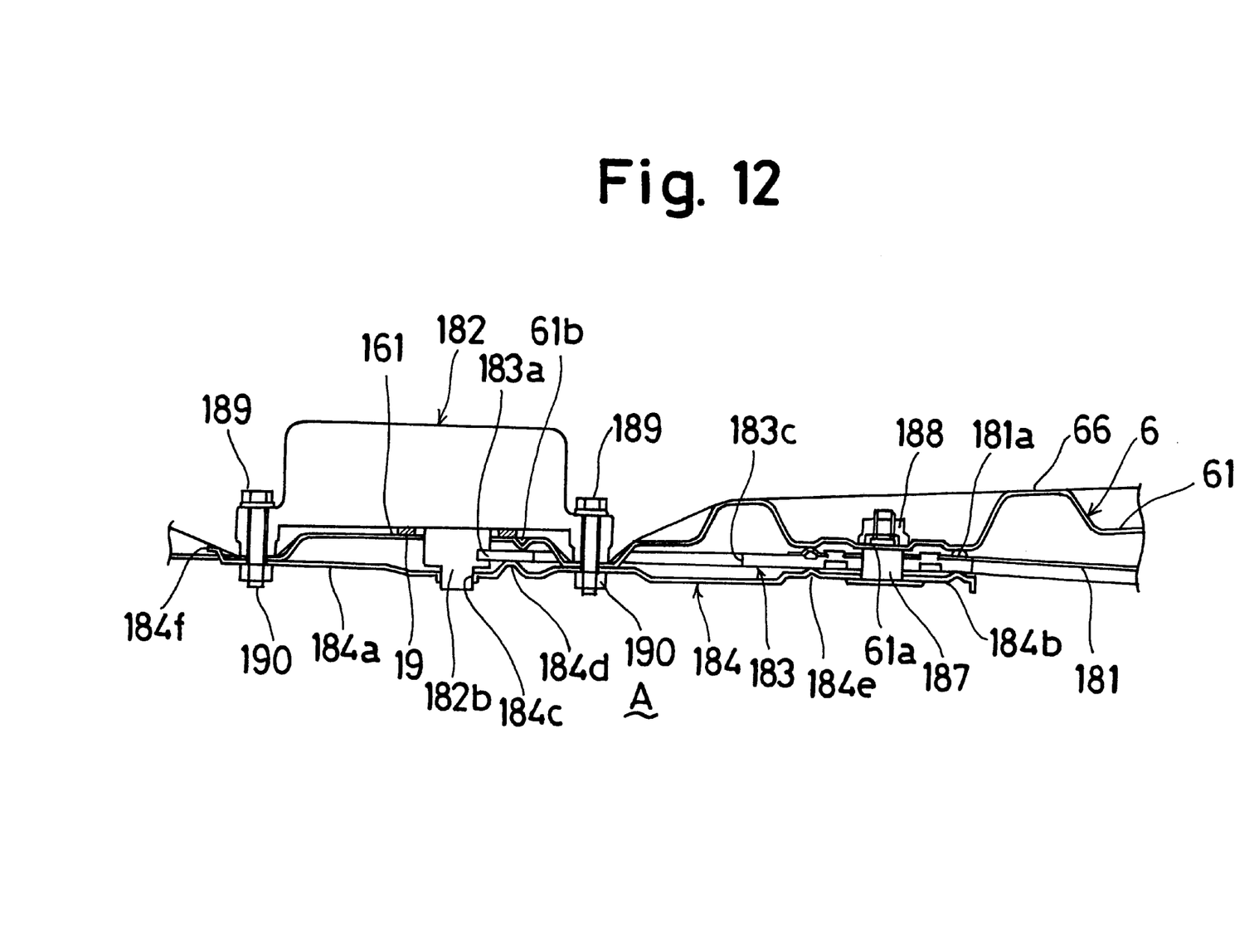
FIG. 12 is a cross-sectional view taken along the section line XII—XII in FIG. 11.

As shown in FIGS. 3 and 12, a window regulator device 18 for regulating the window shield glass 17 is supported on the base panel 6 and is arranged in the internal space A of the vehicle door 1. The window shield glass 17 is moved up and down along the lower frame 73 and the center pillar member 72 of the door frame 7 by operation of the window regulator device 18. The window regulator device 18 causes the window shield glass 17 to move between a closed position in which the window shield glass 17 closes the window 1a of the vehicle door 1 and an open position in which the window shield glass 17 is located within the internal space A of the vehicle door 1 and opens the window 1a of the vehicle door 1.

The window regulator device 18 is composed of a lift arm 181, a drive mechanism 182, a driven gear 183, and a sub base plate 184. The lift arm 181 is rotatably supported on the center portion 61 of the base panel 6 at the side of the base panel 6 facing away from the vehicle compartment and is arranged in the internal space A of the vehicle door 1. A pivot pin 187 is fixed to one end of the lift arm 181. The pivot pin 187 extends through the through hole 61a in the center portion 61 of the base panel 6. The lift arm 181 is thus supported at the center portion 61 of the base panel 6 by the pivot pin 187. The other end of the lift arm 181 is slidably supported on the guide rail 171 which is fixed to the lower edge of the window shield glass 17.

The drive mechanism 182 is attached to the base panel 6 at the side of the base panel 6 facing toward the vehicle compartment in the manner shown in FIG. 12, with the cover 15 sandwiched between the drive mechanism 182 and the base panel 6. The drive mechanism 182 is arranged outside the internal space A of the vehicle door and is attached to the base panel 6 by several bolts 189 each receiving a corresponding nut 190. The drive mechanism 182 includes a motor 182a and an output pinion gear 182b. The motor 182a and the output pinion gear 182b are connected to each other through a reduction gear mechanism to transmit drive power form the motor 182a to the output pinion gear 182b. Respective opening holes 19 are formed in the center portion 61 of the base panel 6 and the cover 17. The output pinion gear 182b is positioned in the internal space A of the vehicle door 1 through the opening hole 19. A seal member 161 is arranged between the drive mechanism 182 and the base panel 6 around the output pinion gear 182b to prevent water from entering the internal space A.

The driven gear 183 is fixed to the one end of the lift arm 181 around the pivot pin 187. The driven gear 183 possesses an arcuate or circular gear portion 183a. The circular gear portion 183a of the driven gear 183 is engaged with the output pinion gear 182b of the drive mechanism 182.

The sub base plate 184 is supported on the base panel 6 and is arranged at the side of the base panel 6 facing away from the vehicle compartment so that the driven gear 183 is sandwiched between the sub base plate 184 and the base panel 6. One end of the sub base plate 184 is provided with a supporting portion 184a and the other end of the sub base plate 184 is provided with a supporting portion 184b.

The supporting portion 184a which is formed at one end of the sub base plate 184 is screwed to the base panel 6 together with the drive mechanism 182 by the bolts 189 and the nuts 190. An opening 183c is formed in the driven gear 183 and one of the bolts 189 extends through the opening 183c in the driven gear 183. The opening 183c also advantageously reduces the weight of the driven gear 183.

The supporting portion 184a is provided with an engaging portion 184f that is adapted to engage the base panel 6 by extending through a slot in the base panel 6 as shown in FIG. 12. The nuts 190 are preferably fixed to the sub base plate 184 (e.g., by welding). The engagement of the engaging portion 184f with the base panel 6 temporarily supports the supporting portion 184a with respect to the base panel 6 to facilitate assembly of the various parts by helping to ensure that the holes in the sub base plate 184 which receive the bolts 189 are properly positioned.

A rib portion 184d is formed in the supporting portion 184a and projects toward the driven gear 183. The rib portion 184d contacts the driven gear 183 so that the driven gear 183 is sandwiched between the rib portion 184d of the supporting portion 184a and the center portion 61 of the base panel 6 adjacent the gear portion 183a of the driven gear 183 as shown in FIG. 12. A rib portion 61b is also formed in the center portion 61 of the base panel 6 at a position substantially corresponding to the rib portion 184d of the supporting portion 184a of the sub base plate 184. An aperture 184c is formed in the supporting portion 184a to rotatably support the output pinion gear 182b of the drive mechanism 182.

The supporting portion 184b which is formed at the opposite end of the sub base plate 184 is screwed to the base panel 6 together with the lift arm 181 by the pivot pin 187 and a nut 188 located on the inner side of the vehicle compartment with respect to the base panel 6. A rib portion 184e is formed in the supporting portion 184b around the pivot pin 187 as shown in FIG. 12. The rib portion 184e of the supporting portion 184b extends toward the driven gear 183 and contacts the driven gear 183 on the side facing the outer side of the vehicle compartment of the base panel 6. The driven gear 183 and the one end of the lift arm 181 are sandwiched between the rib portion 184e of the supporting portion 184b and the center portion 61 of the base panel 6.

Another rib portion 181a is also formed in the lift arm 181 around the pivot pin 187. The rib portion 181a contacts the center portion 61 of the base panel 6. Therefore, the lift arm 181 is in line contact with the center portion 61 of the base panel 6 rather than surface-to-surface contact. As a result, friction between the lift arm 181 and the base panel 6 is reduced so that the rotation of the lift arm 181 relative to the base panel 6 is relatively smooth.

The driven gear 183 is sandwiched between the sub base plate 184 and the base panel 6. Therefore, movement of the drive mechanism 182 along the axis of the pivot pin 187 of the driven gear 183 relative to the output pinion gear 182b is prevented. As a result, the engagement between the driven gear 183 and the output pinion gear 182b of the drive mechanism 182 is reliably maintained.

A pair of equalizer arm 185, 186 are rotatably supported on the lift arm 181. An end of the equalizer arm 185 is slidably supported on the guide rail 171 of the window shield glass 17. The other end of the equalizer arm 186 is slidably supported in an oblong hole 61c formed in the center portion 61 of the base panel 6 and extending along the front and rear direction of the vehicle door 1. The equalizer arms 185, 186 control the movement attitude of the window shield glass 17. That is, when the drive mechanism 182 is operated, the driven gear 183 rotates and causes up and down movement of the guide rail 171 which supports the window glass.

By virtue of the construction of the vehicle door of the present invention, several structural characteristics of the vehicle door contribute to the attachment strength of the door hinge devices 9, 10 and the door lock device 11. As noted above, loads applied to the door lock device are able to travel to the door hinge devices 9, 10 through the base panel 6, through the door frame 7 and through the door impact beam 8. Thus, superior attachment strength characteristics can be achieved without increasing the thickness of the door inner panel.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A vehicle door assembly comprising:
   a door inner panel having a hinge attachment portion on which is to be mounted a pair of door hinge devices and a lock attachment portion on which is to be mounted a door lock device; and
   a base panel having a center portion, four arm portions extending from the center portion for uniting the base panel to the door inner panel, and a rib portion, said four arm portions including first and second arm portions fixed to said hinge attachment portion, a third arm portion attached to said lock attachment portion, and a fourth arm portion attached to a corner portion of said inner panel, the second and fourth arm portions being oppositely located, said rib portion successively extending diagonally along said second arm portion from said fourth arm portion through said center portion.

2. A vehicle door assembly according to claim 1, including a door outer panel united to the door inner panel.

3. A vehicle door assembly according to claim 2, including a door trim united to the door inner panel.

4. The vehicle door assembly according to claim 2, wherein the door inner panel is comprised of a hinge side panel arranged along a front edge of the door outer panel and at which is provided the hinge attachment portion, a lock side panel arranged along a rear edge of the door outer panel opposite the hinge side panel and at which is provided the lock attachment portion, an upper reinforcement arranged along an upper edge of the door outer panel and connected to the hinge side panel and the lock side panel, and a lower panel arranged along a lower edge of the door outer panel opposite the upper reinforcement and connected to the hinge side panel and the lock side panel, at least one of said arm portions being fixed to a connecting portion which connects the lock side panel and the upper reinforcement.

5. The vehicle door assembly according to claim 4, including a door frame forming a window opening above the door outer panel and having one end connected to the door inner panel at the hinge attachment portion of the door inner panel and another end connected to the door inner panel at the lock attachment portion of the door inner panel.

6. The vehicle door assembly according to claim 6, including a door impact beam arranged between the door outer panel and the door inner panel and having one end connected to the door inner panel at the hinge attachment portion and another end connected to the door inner panel at the lock attachment portion.

7. The vehicle door assembly according to claim 2, wherein the door lock device is positioned to and inner side of the door inner panel.

8. The vehicle door assembly according to claim 1, wherein the base panel has a supporting portion on which is mounted a window regulator device.

9. The vehicle door assembly according to claim 9, wherein the window regulator device includes a lift arm rotatably supported on the supporting portion of the base panel, a drive mechanism mounted on the door inner panel and a sub base plate attached to the base panel, the lift arm having a rotating portion, and a connecting portion between the lift arm and the drive mechanism, the rotating portion and the drive mechanism being sandwiched between the sub base plate and the base panel.

10. The vehicle door assembly according to claim 9, wherein the base panel has an opening through the connecting portion between the lift arm and the drive mechanism, with the lift arm being positioned to an outer side of the door inner panel and the drive mechanism being positioned to the inner side of the door inner panel.

11. A vehicle door assembly comprising:
    a door inner panel having a hinge attachment portion and a lock attachment portion;
    a pair of door hinge devices mounted on the hinge attachment portion of the door inner panel by respective first securing devices;
    a door lock device mounted on the lock attachment portion by a second securing device; and
    a base panel having at least three arm portions connecting the base panel to the door inner panel, said three arm portions including a first arm portion connected to the hinge attachment portion of the door inner panel by one of said first securing devices, a second arm portion connected to the hinge attachment portion of the door inner panel by one of said first securing devices, and a third arm portion attached to said lock attachment portion of the door inner panel by said second securing device.

12. The vehicle door assembly according to claim 11, wherein the door inner panel includes a hinge side panel at which is provided the hinge attachment portion, a lock side panel arranged opposite to the hinge side panel and at which is provided the lock attachment portion, an upper reinforcement connected to the hinge side panel and the lock side panel, and a lower reinforcement arranged opposite to the upper reinforcement and connected to the hinge side panel and the lock side panel, said base panel including a fourth arm portion fixed to a connecting portion at which the lock side panel is connected to the upper reinforcement.

13. The vehicle door assembly according to claim 12, including a door frame forming a window opening, said door frame having one end connected to the door inner panel at the hinge attachment portion of the door inner panel and another end connected to the door inner panel at the lock attachment portion of the door inner panel.

14. The vehicle door assembly according to claim 13, including a door impact beam having one end connected to the door inner panel at the hinge attachment portion and another end connected to the door inner panel at the lock attachment portion.

15. The vehicle door assembly according to claim 11, wherein the base panel includes a supporting portion, and including a window regulator device mounted on the base panel, the window regulating device including a lift arm rotatably supported on the supporting portion of the base panel, a drive mechanism mounted on the door inner panel and a sub base plate attached to the base panel, the lift arm having a rotating portion, and a connecting portion between the lift arm and the drive mechanism, the rotating portion and the drive mechanism being sandwiched between the sub base plate and the base panel.

16. A vehicle door assembly comprising:
    a door inner panel having a hinge attachment portion and a lock attachment portion;
    a pair of door hinge devices mounted on the hinge attachment portion of the door inner panel by respective first securing devices;
    a door lock device mounted on the lock attachment portion by a second securing device;
    a base panel having a plurality of arm portions connecting the base panel to the door inner panel; and
    a door frame forming a window opening, said door frame having one end connected to the hinge attachment portion of the door inner panel by one of said first securing devices, and another end connected to the lock attachment portion of the door inner panel.

17. The vehicle door assembly according to claim 16, including a door impact beam having one end connected to the door inner panel at the hinge attachment portion and another end connected to the door inner panel at a connecting portion at which the door frame is connected to the door inner panel.

18. The vehicle door assembly according to claim 16, wherein said arm portions include one arm portion connected to the hinge attachment portion of the door inner panel by one of said first securing devices and another arm portion attached to said lock attachment portion of the door inner panel by said second securing device.

19. The vehicle door assembly according to claim 16, wherein the door inner panel includes a hinge side panel at which is provided the hinge attachment portion, a lock side panel arranged opposite to the hinge side panel and at which is provided the lock attachment portion, an upper reinforcement connected to the hinge side panel and the lock side panel, and a lower reinforcement arranged opposite to the upper reinforcement and connected to the hinge side panel and the lock side panel, one of said plurality of arm portions being fixed to a connecting portion at which the lock side panel is connected to the upper reinforcement.

* * * * *